Patented July 2, 1946

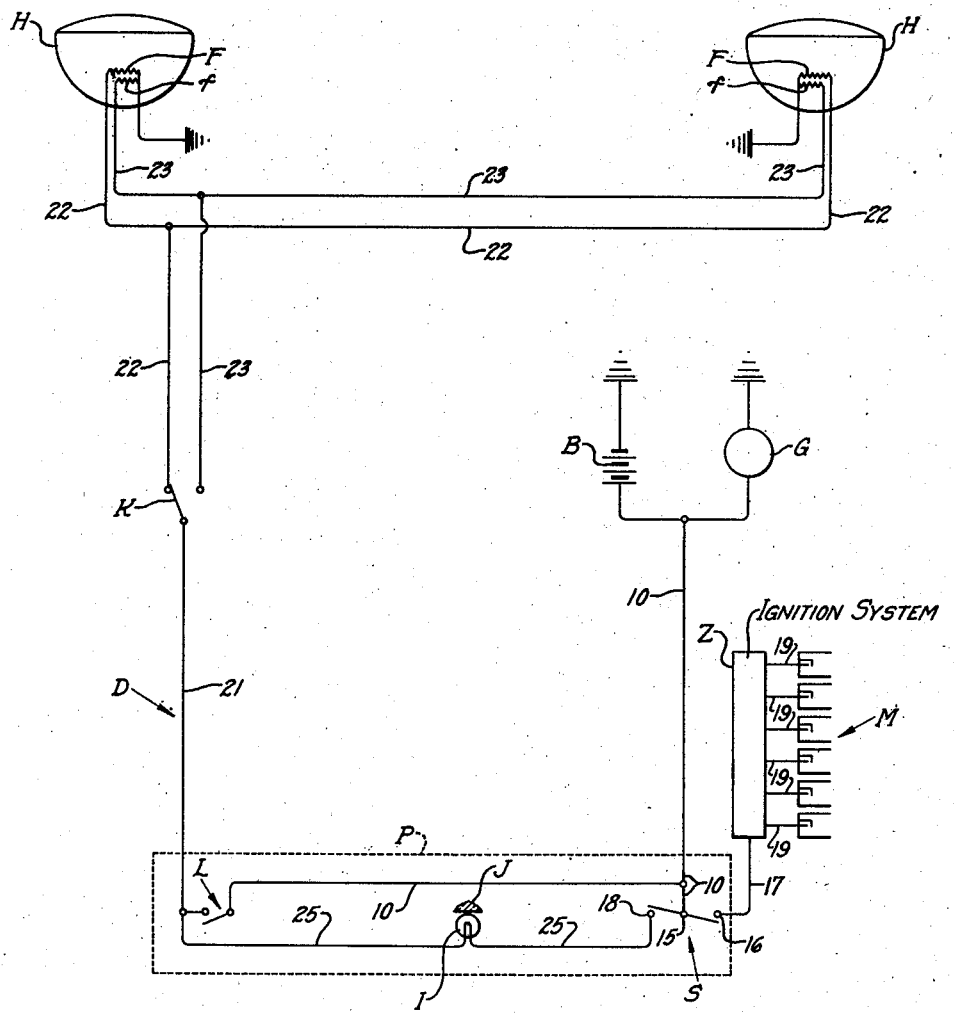

2,403,123

UNITED STATES PATENT OFFICE 2,403,123

HEADLIGHT INDICATOR

Val J. Roper, South Euclid, Ohio, assignor to General Electric Company, a corporation of New York Application October 6, 1943, Serial No. 505,211

2 Claims. (Cl. 177—311)

This invention relates to driving light systems of power vehicles, such as the headlight systems of automobiles or other motor vehicles. An important aim of the invention is to indicate to a vehicle driver whether his headlights are lighted or not, giving him preferably a positive warning when he has neglected to switch them on. Thus the driver is protected against inadvertently driving his car out of a brightly lighted parking area on to a brightly lighted highway without proper driving lights. The indication or warning may be of any desired character, whether auditory or visual, and may be brought about by the closing of an electric switch to energize an electrical power-controlling system or circuit of a power-driven vehicle—i. e., the ignition switch of an ordinary gasoline-propelled vehicle.

Various other features and advantages of the invention will become apparent from the description of a species and form of embodiment of the invention, and from the drawing.

The single figure of the drawing is an electric circuit diagram of the power-controlling and driving light systems of a motor vehicle with my invention applied thereto.

The drawing illustrates very diagrammatically features of the usual electrical system of a gasoline-propelled automobile which are important for an understanding of my invention. Accordingly, there is shown a (double) source of electrical energy, such as a storage battery B and a generator G, connected in parallel to a power supply circuit 10 which may include the usual intermediaries (such as an ammeter, a current and voltage regulator, etc., not shown), and is connected to a live contact or switch element 15 of an ignition switch S. Besides the live contact 15, a controlled contact 16 of switch S is here shown, which is connected to circuit 17 of the power-controlling or ignition system Z of the main vehicle-propelling internal combustion gasoline engine or motor M. Another controlled contact 18 of switch S is also shown, which is commonly connected to accessory circuits about the car (not shown) that are only to be energized when the system Z is energized. The ignition system Z may include the usual features of such a system, such as the ignition coil, breaker, and distributor, not shown, with leads 19 to the motor cylinder spark-plugs. The driving-light system D here shown is connectable to a branch of the circuit 10 through an interposed light switch L, which controls energization of the system D from the source B, G. Besides a circuit 21 from the switch L with branches 22, 23 alternatively connectable thereto through the foot-selector switch K, the driving-light system D is shown as comprising headlights H, H (of sealed-beam type, such as commercially designated PAR 56) whose brighter filaments F, F are connected in parallel to the circuit branch 22 and whose other filaments f, f are connected in parallel to the circuit branch 23. The return circuits to the source B, G are indicated by ground connections.

As thus far explained, the electrical system is one in common use for passenger automobiles, and has been described only as a background to facilitate the understanding of my invention; moreover, various usual features and details of such a system that are not essential to an understanding of my invention have neither been illustrated nor referred to.

For the purpose of indicating to the driver of the car whether his driving lights are on, in accordance with my invention, an electrical indicator I, which is represented as of visual character, and in the form of a low-wattage high-resistance incandescent lamp, is connected in a circuit 25 between the controlled ignition switch contact 18 and the driving-light system D at the controlled side of the lighting switch L. It is preferred to connect the indicator circuit 25 to an accessory circuit contact 18, rather than to the ignition circuit contact 16, because in practice the contact 18 is more accessible and convenient for the purpose. An indicator I of much higher resistance than the system D is suitable, such for example as the incandescent electric lamp commercially designated #51. The indicator lamp I may be mounted on the instrument panel P of the car dash along with the ignition and lighting switches S, L, and may be made more conspicuous by shining through or upon a glass "jewel" or other material J prominently located on the dash. This material may be red or of other suitable color, preferably other than green.

With the live contact 15 of the ignition switch S energized from the battery B and the switches S, L both open, as shown, no current flows through the indicator I, so that it does not operate. When the ignition switch S is closed to energize the ignition system Z preliminary to starting the car, the contact 18 is energized and a circuit is completed through the indicator I, the circuit 21 and its branch 22 or 23 (according to the position of the selector switch K), and the headlight filaments F, F or f, f to ground, thus energizing the indicator I so that it lights up. Owing to the much higher resistance of the lamp I as compared with the driving-light system D and the filaments F, F or f, f in parallel, the current flow is insufficient to light up the headlights H, H. Thus the driver is positively and conspicuously warned that his headlights are not on.

Closing the switch L to light the headlights H, H provides a shunting current path of very much lower resistance around the filament of the lamp I, thus shorting out this filament so that the lamp is no longer lighted. As a #51 incandescent lamp I takes only 0.2 amp. current at its rated voltage of 7.5 volts and has a rated life of 1000 hours at this voltage, the slight ineconomy of the current through it during daytime driving is inconsiderable. It is further to be remarked that with usual light-switching arrangements, the indicator I will be operated even when the small "parking lights" (not shown) are on, which is desirable, since driving with the parking lights only is recognized as unsafe practice, even on well-lighted streets.

What I claim as new and desire to secure by Letters Patent of the United States is:

1. In combination with a motor vehicle ignition system comprising a source of electric energy and an ignition switch for energizing and deenergizing said ignition system, a headlighting system comprising an incandescent electric headlamp and an electric indicator lamp connected in series between said ignition switch and said source of energy so that current always flows therethrough when the ignition switch is closed, the resistance of said indicator lamp being sufficiently high to prevent sufficient current flow through said headlamp to illuminate it, and a selectively operable lighting switch connected across said indicator lamp to shunt it when said lighting switch is closed.

2. In combination with a motor vehicle ignition system comprising a source of electric energy and an ignition switch for energizing and deenergizing said ignition system, a headlighting system comprising an incandescent electric headlamp and an incandescent electric indicator lamp connected in series between said ignition switch and said source of energy so that current always flows therethrough when the ignition switch is closed, the resistance of said indicator lamp being sufficiently high to prevent sufficient current flow through said headlamp to illuminate it, and a selectively operable lighting switch connected across said indicator lamp to shunt it when said lighting switch is closed.

VAL J. ROPER.